United States Patent [19]

Runciman

[11] Patent Number: 5,719,671
[45] Date of Patent: Feb. 17, 1998

[54] BORESIGHTING OPTICAL SYSTEM

[75] Inventor: Herbert Morrison Runciman, Glasgow, United Kingdom

[73] Assignee: Barr & Stroud Limited, Glasgow, Scotland

[21] Appl. No.: 802,614

[22] Filed: Feb. 19, 1997

[30] Foreign Application Priority Data

Mar. 22, 1996 [GB] United Kingdom ............ 9606091

[51] Int. Cl.$^6$ .................................................. B01B 11/26
[52] U.S. Cl. .................................... 356/153; 356/152.1
[58] Field of Search ............................ 356/152.1, 152.2, 356/152.3, 153, 247; 348/136, 137, 140

[56] References Cited

U.S. PATENT DOCUMENTS

| 3,241,430 | 3/1966 | Kulick | 356/152.3 |
| 3,582,215 | 6/1971 | Cornillault | 356/152.3 |
| 4,422,758 | 12/1983 | Godfrey et al. | 356/152.1 |
| 4,468,119 | 8/1984 | Hamar | 356/152.1 |
| 5,400,132 | 3/1995 | Trepagnier | 356/153 |

FOREIGN PATENT DOCUMENTS 1359670A 12/1987 Russian Federation ............ 356/152.3

*Primary Examiner*—Frank G. Font
*Assistant Examiner*—Zandra V. Smith
*Attorney, Agent, or Firm*—Bell Seltzer Intellectual Property Law Group; Alston & Bird LLP

[57] ABSTRACT

An optical system 10 comprises a light source 12 which may be either a point source or collimated and an arrangement 11,22 for directing a beam of light from the source 12 towards a boresighting arrangement 16 associated with an imaging lens 14 for imaging objects in object space 13 onto a detection surface 15. The boresighting arrangement 16 provides a marker on the surface 15 denoting the pointing direction 18 of the system 10 and is arranged so that the marker is of box-like pattern (17A, B 19A, B) closely centred on the pointing direction 18 so as to avoid obscuration of that part of the object image which is coincident with the pointing direction 18.

11 Claims, 2 Drawing Sheets

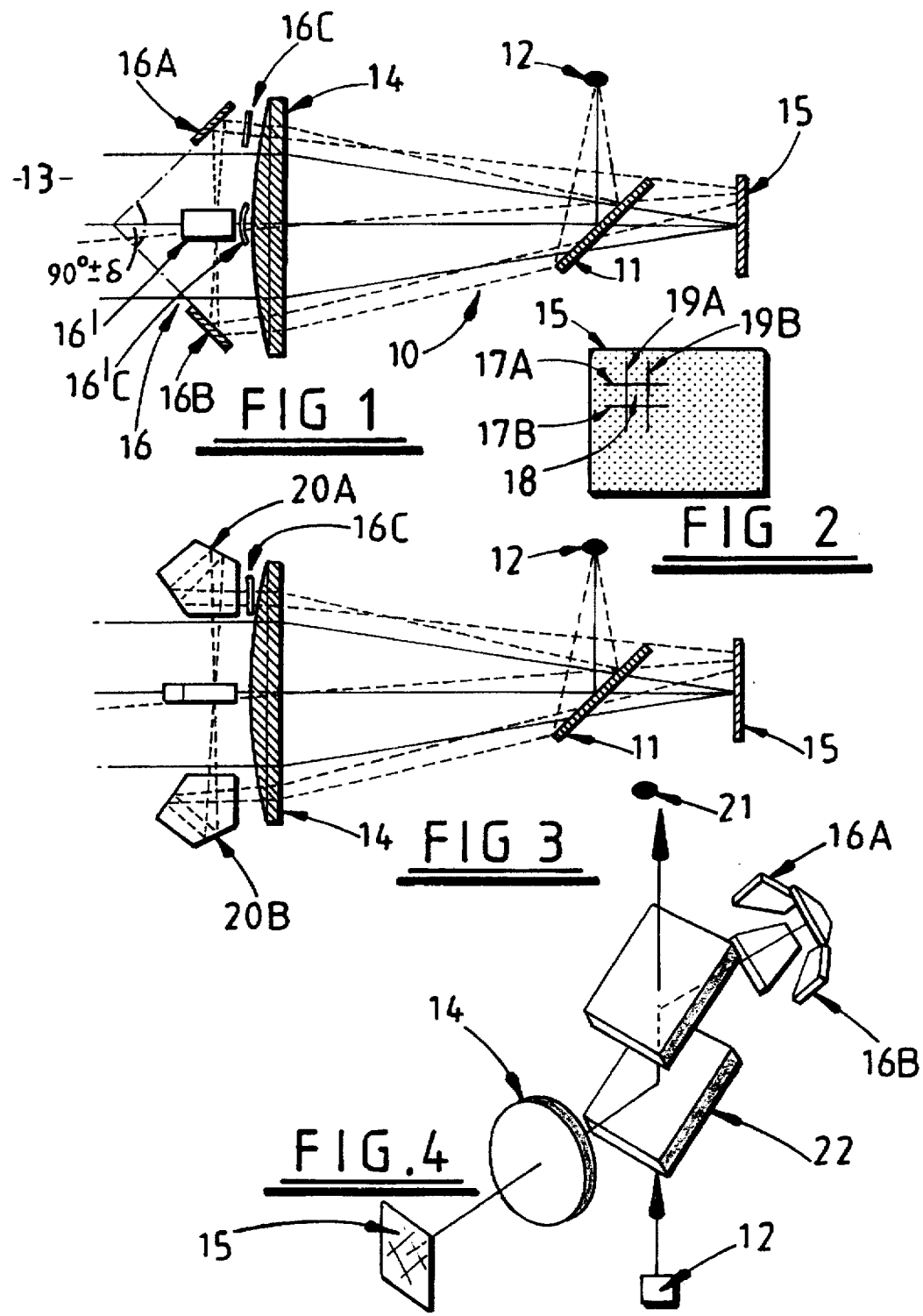

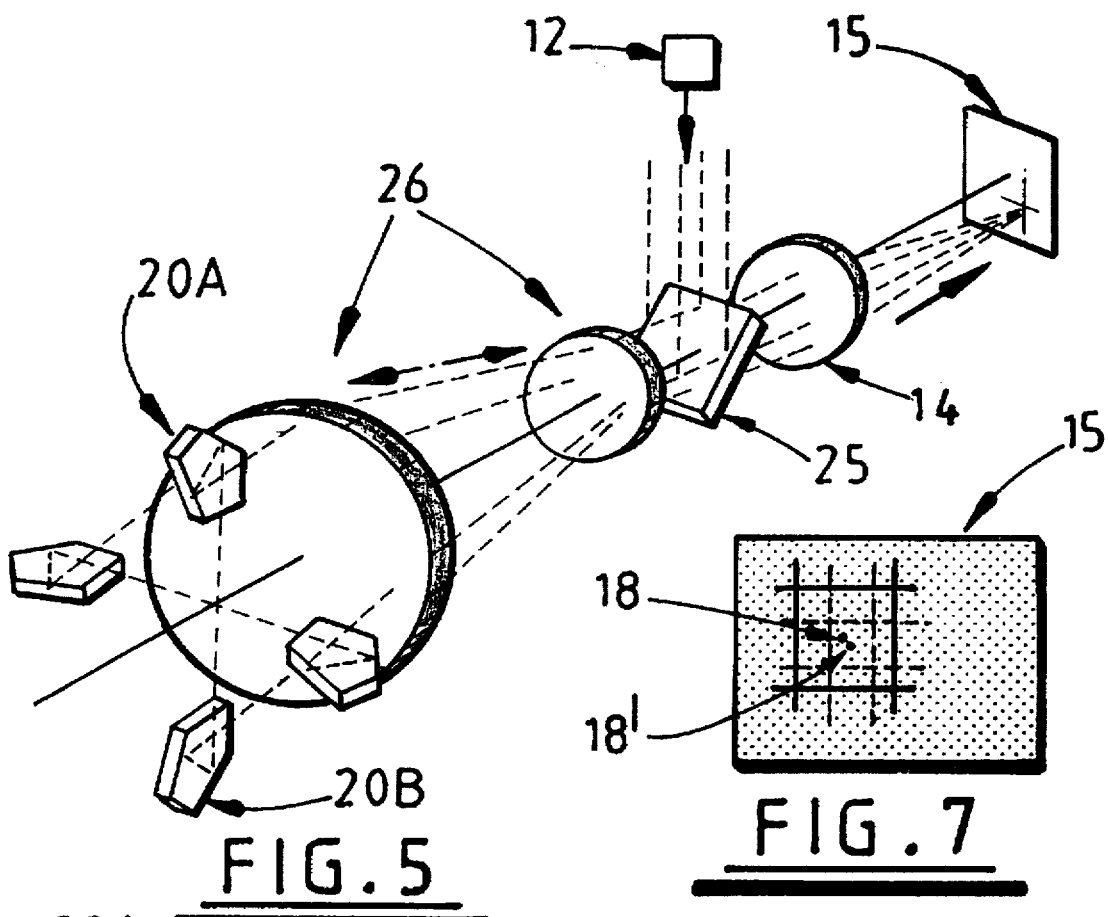
FIG. 5
FIG. 7
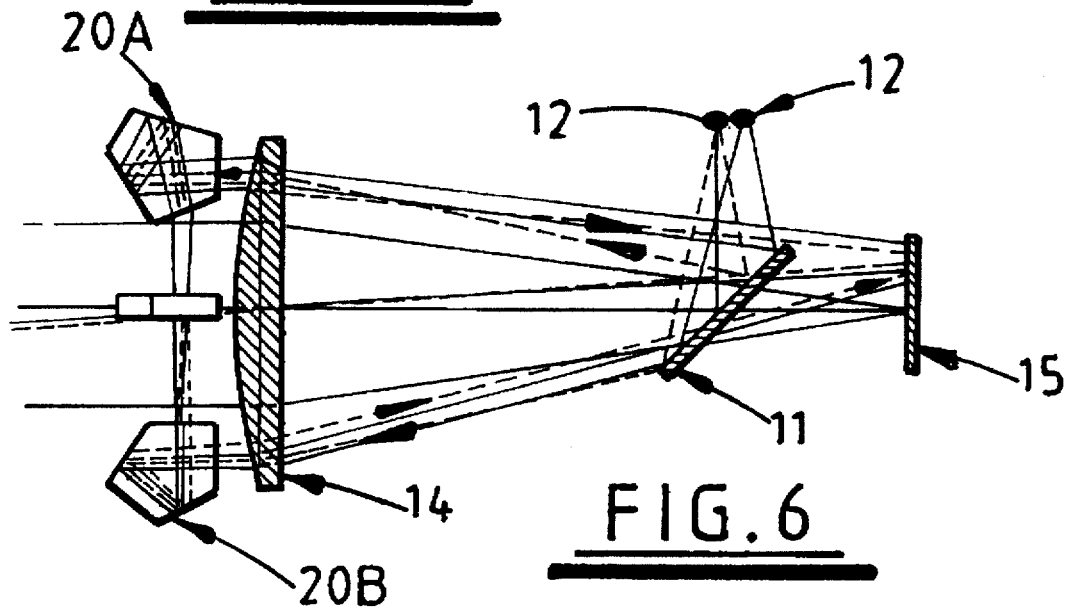
FIG. 6

BORESIGHTING OPTICAL SYSTEM

This invention relates to optical systems and in particular to optical systems which direct or point a beam of light towards object space, image objects in object space onto a detection surface, and which are provided with a boresighting arrangement, ie an arrangement providing a marker on the detection surface which denotes the pointing direction of the system.

A commonly used boresighting arrangement uses a corner cube to reflect part of the outgoing beam back through the imaging lens of the system in precisely the opposite direction to the outgoing beam and to thereby form a point-like reference spot on the detection surface. When the spot is centred on the object image formed on the detection surface the outgoing beam is precisely centred, or boresighted, on the object. This technique is satisfactory in many cases but if the object image is small and of lower brightness than the reference spot or is large and of much higher brightness than the reference spot it is difficult for a human observer to assess boresighting accuracy. If the observation is electro-optic, such as by a CCD camera, it is extremely difficult to assess boresighting accuracy to better than the pixel size of the sensor.

It is an object of the present invention to provide an optical system incorporating a new and improved boresighting arrangement.

According to the present invention there is provided an optical system comprising a light source, means for directing a beam of light from the light source towards object space, a detection surface, an imaging lens for imaging objects in object space onto the detection surface, and a boresighting arrangement for providing a marker on the detection surface which denotes the pointing direction of the system, wherein the boresighting arrangement forms two intersecting pairs of parallel straight lines which define a marker of box-like pattern closely centred on the pointing direction.

By virtue of the present invention the marker formed by the boresighting arrangement does not obscure that portion of the object image which is coincident with the pointing direction so that for a human observer boresighting accuracy can be assessed comparatively easily irrespective of the relative brightness and size of the image and when observation is by electro-optic means boresighting to less than one sensor pixel size can be achieved when the box-like pattern is skewed relative to the pixel row and column orientation.

The light source may operate in any part of the spectrum such as visible or infrared and for example may be a laser source or a tungsten lamp. Furthermore, there may be several light sources each operating at different wavelengths and simultaneously or consecutively directing beams of light toward object space and the boresighting arrangement forms a corresponding number of box-like pattern markers. The size of the box-like pattern markers may be different for each wavelength.

The boresighting arrangement preferably comprises two optical sub-systems each of which counter-reflects portions of the outgoing beam as two beams which make equal and opposite deviation angles with the outgoing beam, each sub-system incorporating an anamorphic component to cause the two return beams to form two spaced parallel straight lines (rather than two circular spots) on the detection surface. It is preferred that the two sub-systems are orthogonally disposed so that the box-like pattern marker is rectilinear. It is further preferred that each sub-system forms the same deviation angle so that a square box-like pattern marker results. The deviation angle is typically less than 1° and preferably is of the order of 0.5° which in combination with the focal length of the lens provides for the box-like pattern being centred closely on the pointing direction. The greater the deviation angle the greater is the size of the box-like pattern; the further away it is from the pointing direction the greater is the difficulty in assessing its centre and hence in assessing the boresighting accuracy.

Embodiments of the present invention will now be described by way of example with reference to the accompanying drawings in which:

FIG. 1 illustrates an optical system according to the present invention with a boresighting arrangement formed by mirrors;

FIG. 2 shows the detection surface of the FIG. 1 system;

FIG. 3 illustrates a modification of the FIG. 1 system which uses pentag prisms instead of mirrors;

FIG. 4 schematically illustrates an alternative configuration to the FIG. 1 system;

FIG. 5 illustrates a system utilising a collimated light source;

FIG. 6 illustrates a system utilising two light sources; and

FIG. 7 shows the detection surface of the FIG. 6 system.

As shown in FIG. 1 an optical system 10 comprises a beamsplitter 11 for directing a beam of light from a point light source 12 towards object space 13, and an imaging lens 14 for imaging objects in object space 13 onto a detection surface 15 formed at the focal plane of the lens 14. The system 10 also comprises a boresighting arrangement for providing a marker on the detection surface 15 which denotes the pointing direction of the system 10. The pointing direction coincides with the centre of the outgoing beam of light from source 12.

In the FIG. 1 system the boresighting arrangement is provided by a first optical sub-system 16 in the plane of the paper and a second optical sub-system (partly shown at 16$^1$) at right angles to the plane of the paper. Sub-system 16 comprises a pair of spaced mirrors 16A, 16B and an anamorphic component in the form of a cylindrical lens 16C located in object space 13 at the periphery of the lens 14 where light from the point source 12 is collimated. The axis of the cylindrical lens 16C lies in the plane of the paper. Accordingly, a first collimated beam is reflected by mirror 16A toward mirror 16B where it is reflected through the lens 14 to be focused as a first single straight line 17A on the detection surface 15. The detection surface 15 is illustrated in FIG. 2. In the absence of the cylindrical lens 16C the line would be a circular spot. Additionally, a second collimated beam is reflected by mirror 16B towards mirror 16A and from there it is reflected through the lens 14 to be focused as a second single straight line 17B on the detection surface 15. The mirrors 16A, 16B are plane mirrors which are almost but not exactly at right angles to each other and the deviation from orthogonality causes the two lines 17A, 17B to be non-coincident and to lie above and below the exact pointing direction 18.

The second sub-system is identical to sub-system 16 except that it is physically at right angles thereto and incorporates cylindrical lens 16$^1$C which has its axis perpendicular to the paper and accordingly results in lines 19A, 19B at right angles to lines 17A, 17B so that a marker in the form of a box-like pattern is formed on the detection surface 15. The line pairs 17, 19 intersect and are centred on the pointing direction 18 which in this embodiment is determined by the orientation of the beamsplitter 11. If it is not at 45° to the optical axis of the lens 14 the pointing direction is not at the centre of the detection surface 15.

The cylindrical lens 16C may be replaced with a cylindrical surface on one of the mirrors and because the beams forming both lines 17A, 17B traverse both mirrors 16A, 16B it will be understood that only one anamorphic component is required per sub-system 16. The length of each line 17A, 17B is determined by the lens 16C and the thickness of the lines 17A, 17B is determined by diffraction. The spacing between the lines 17A, 17B is determined by 4.δ.F where δ is the deviation angle from mutual orthogonality of the mirrors 16A, 16B and F is the focal length of the lens 14. For maximum efficiency the radius of the lens 16C should be such that the angular spread perpendicular to the plane of the paper is comparable with the angular separation between the beams.

As is shown in FIG. 2 the lines 17, 19 are parallel to the edges of the rectangular detection surface 15. This arises because of the orientation of the sub-systems 16. By rotating both sub-systems with respect to the optical axis of lens 14 through say 30° the box-like marker pattern provided by the lines 17, 19 is skewed at an angle of 30° to the edges of the detection surface. This is of particular value when the detection surface 15 is a matrix of electro-optic sensors parallel to the edge of the surface 15 because the exact location of the pointing direction 18 can be assessed to sub-pixel accuracy by interpolation performed by the data-handling unit (not shown) which is connected to the surface 15.

FIG. 3 illustrates a modification of the FIG. 1 system wherein the mirrors 16A, 16B etc are replaced by constant deviation prisms 20A, 20B etc. Such pentag prisms have a high degree of physical and temperature stability and the size and shape of the box-like marker is independent of the mutual angular alignment of the prism pairs 20A, 20B being determined solely by the angle between the surfaces of each prism which of course is established at the manufacturing stage. The required anamorphic component may be a cylindrical lens as previously described or a cylindrical surface on at least one prism surface.

FIG. 4 shows an alternative configuration of the system 10 where the light source 12 provides a collimated beam which is directed towards a distant object 21 and traverses a beamsplitter arrangement 22. Part of the outgoing beam power is diverted by arrangement 22 to the assembled four mirrors 16A, 16B etc which direct their four return beams via arrangement 22 to the lens 14 and so to the detection surface 15. The remainder of the outgoing beam power illuminates the object 21 an image of which is formed by lens 14 at the detection surface 15. This configuration avoids obscuration of part of the outgoing beam by the assembly of mirrors 16A, 16B etc and the mirrors can therefore be tightly packed rather than being separated by the diameter of the lens 14. FIG. 4 also illustrates the box-like pattern marker skewed to the edges of the detection surface 15 by an angle of about 45°.

FIG. 5 illustrates a further configuration of the system 10 of FIG. 3 where the outgoing beam of a collimated light source 12 is steered by a beamsplitter 25 located behind a telescope 26.

The foregoing embodiments apply to the presence of a single light source 12. If there is an adjacent second light source there will be a second box-like marker formed on the detection surface 15 and it will not be easy to distinguish one from the other either by eye or by electro-optics unless birefringence can be used to make the size of the marker pattern polarisation dependent. However, if the two light sources have different wavelengths and the sub-systems 16 are spectrally dependent as regards deviation angle the sizes of the two box-like markers become different and so can be separately distinguished. Spectral dependence of the deviation angle is easily achieved by including a diffraction grating or by replacing a pentag prism with a constant-deviation dispersive prism and this is illustrated in FIG. 6. The detection surface 15 for the FIG. 6 system is shown in FIG. 7 illustrating the two estimates of pointing direction 18 and $18^1$ arising from the light sources 12 and $12^1$ respectively. A similar result can be achieved with the FIG. 1 system by replacing one of the mirrors 16A, 16B with a reflective diffraction grating.

I claim:

1. An optical system comprising a light source, means for directing a beam of light from the light source towards object space, a detection surface, an imaging lens for imaging objects in object space onto the detection surface, and a boresighting arrangement for providing a marker on the detection surface which denotes the pointing direction of the system, wherein the boresighting arrangement forms two intersecting pairs of parallel straight lines which define a marker of box-like pattern closely centred on the pointing direction.

2. An optical system as claimed in claim 1, wherein the boresighting arrangement comprises two optical sub-systems each of which counter-reflects portions of the outgoing beam as two beams which make equal and opposite deviation angles with the outgoing beam, each sub-system incorporating an anamorphic component to cause the two return beams to form two spaced parallel straight lines (rather than two circular spots) on the detection surface.

3. An optical system as claimed in claim 2, wherein the two sub-systems are orthogonally disposed so that the box-like pattern marker is rectilinear.

4. An optical system as claimed in claim 3, wherein each sub-system forms the same deviation angle so that a square box-like pattern marker results.

5. An optical system as claimed in claim 2, wherein each sub-system comprises a pair of mirrors and a cylindrical lens.

6. An optical system as claimed in claim 2, wherein each sub-system comprises a pair of mirrors at least one of which has cylindrical curvature.

7. An optical system as claimed in claim 2, wherein each sub-system comprises a pair of constant deviation (pentag) prisms and a cylindrical lens.

8. An optical system as claimed in claim 2, wherein each sub-system comprises a pair of constant deviation (pentag) prisms at least one of which has cylindrical curvature on one of its reflective faces.

9. An optical system as claimed in claim 1, wherein the light source is a point source and the boresighting arrangement is located in object space at the periphery of the imaging lens.

10. An optical system as claimed in claim 1, wherein the light source is a collimated source and the boresighting arrangement is separated from object space by a beamsplitter arrangement.

11. An optical system as claimed in claim 1, wherein the light source is one of a plurality operating at different wavelengths and the boresighting arrangement is spectrally dependent and forms a corresponding plurality of markers each of box-like pattern and formed of two intersecting pairs of parallel straight lines.

* * * * *